US006269835B1

(12) United States Patent
Kochsmeier

(10) Patent No.: US 6,269,835 B1
(45) Date of Patent: Aug. 7, 2001

(54) PRESSURE-REGULATING ARRANGEMENT

(75) Inventor: Christian Kochsmeier, Brakelsiek (DE)

(73) Assignee: Mannesmann VDO AG (DE)

( * ) Notice: Subject to any disclaimer, the term of this patent is extended or adjusted under 35 U.S.C. 154(b) by 0 days.

(21) Appl. No.: 09/503,830

(22) Filed: Feb. 15, 2000

(30) Foreign Application Priority Data

Aug. 23, 1997 (DE) .............................................. 197 36 846

(51) Int. Cl.[7] ........................................................ G05D 5/00

(52) U.S. Cl. ............... 137/549; 137/115.27; 137/599.14; 210/433.1

(58) Field of Search .......................... 137/115.27, 599.14, 137/549; 210/433.1

(56) References Cited

U.S. PATENT DOCUMENTS 4,310,142 * 1/1982 Ludwig ................................ 137/549
5,078,167 * 1/1992 Brandt et al. ...................... 137/549 I
5,402,817 * 4/1995 Bueser ............................ 137/115.13
5,584,318 * 12/1996 Brandt ................................ 137/549

FOREIGN PATENT DOCUMENTS

1227021 * 3/1971 (GB) .................................... 137/549
1257820 * 12/1971 (GB) .................................... 137/549

* cited by examiner

*Primary Examiner*—A. Michael Chambers
(74) *Attorney, Agent, or Firm*—Richard A. Speer; Mayer, Brown & Platt

(57) ABSTRACT

In a pressure-regulating arrangement between a pump and a load, in particular between a fuel pump and an internal combustion engine, in which, if the flow from the pump exceeds a predetermined pressure, a cutoff quantity is branched off and fed back into a storage container, according to the invention the pressure regulator (9), together with the cutoff line (14), is combined with a filter (2) in one structural unit.

All three connections (feed (4), flow (7) and cutoff connection (15)) are preferably arranged on the same side of a common housing (1). In a particularly advantageous embodiment, all three connections are arranged coaxially with one another, so that if an appropriate connecting piece is used, installation faults can be ruled out.

6 Claims, 1 Drawing Sheet

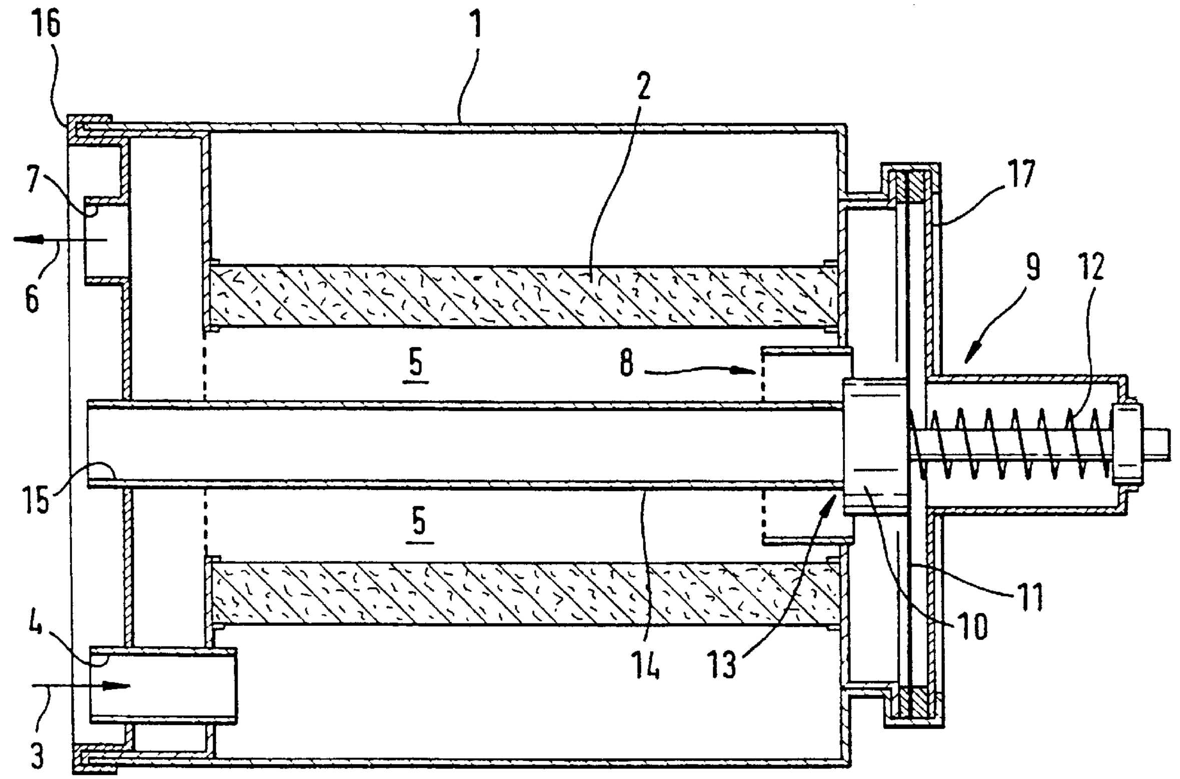
16
1
2
17
7
6
9
12
5
8
15
5
11
4
10
14
13
3

PRESSURE-REGULATING ARRANGEMENT

BACKGROUND OF THE INVENTION

The invention relates to a pressure-regulating arrangement having the features of the precharacterizing clause of Patent claim 1.

It is known (DE 42 24 981 A1) to provide the flow (pressure line) of a fuel pump with a pressure regulator whose switching threshold lies close to the maximum flow pressure. The cutoff quantity/flow is used as a driving jet for a self-priming ejector. The flow takes priority during operation. A fuel filter is often also provided in the flow from the pump, and has to keep contaminants originating from the tank away from the carburettor or injection pump/nozzles. Arrangements of this type have been tried and tested in practice.

The return flow from the injection pump has also already been used as the driving jet for the self-priming ejector. However, attempts are made as far as possible to dispense with a return line, for reasons of cost and in order to reduce possible leakage points (compliance with emission regulations). Instead, it is intended to supply the injection installation with just the amount of fuel which is actually consumed.

A combination of a pressure buffer and a fuel filter has already been proposed (earlier Patent Application 196 27 741.8). There, however, it is only indicated schematically that a chamber through which flow passes and which has a variable volume can be put together with a filter, the flow pressure is controlled as a function of the instantaneous chamber volume, so that neither a return nor a cutoff line is needed.

BRIEF SUMMARY OF THE INVENTION

The invention is based on the problem of reducing to the greatest possible extent the number of individual parts for such a pressure-regulating arrangement having a cutoff stream. According to the invention, this object is achieved with the characterizing features of claim 1. The features of the subclaims indicate advantageous developments of this subject.

If the pressure regulator, together with cutoff line, is combined with a filter in one structural unit, these components are preassembled by the manufacturer to form a unit. During the final assembly on the production line, this unit can be installed into the fuel supply system of the respective vehicle with few operations. Additional line connections between the pressure regulator and the filter are dispensed with, so that not only is the number of parts considerably reduced, but also the amount of labour.

If the pressure regulator is arranged with the filter in a common housing which has a feed connection, a discharge connection and a cutoff connection, the filter cartridge or the filter housing is simply connected downstream of the pump and, in a dual function, provides the pressure limitation and the fine filtering of the fuel stream.

Particularly simple and rapid assembly may be achieved if all three connections are arranged on the same side of the filter housing, since it is then possible, for example, to fasten the filter housing first and then to produce the line connections on a firm base.

The pressure regulator is expediently arranged on a side of the housing that is remote from the connections, so that sufficient installation space for its components, on the one hand, and for the connections, on the other hand, is available.

It is also advantageous if the pressure regulator is arranged downstream of the filter insert. The throttling resistance of the filter insert, which increases over the long term, thus has no influence on the switching behaviour of the pressure regulator. In addition, no unfiltered fuel passes into the cutoff circuit.

A particularly compact design is produced if the cutoff line is arranged coaxially with the filter.

The common housing will preferably consist of sheet metal and be tightly closed on both sides by covers—for example by being peened over. For the purpose of the mechanical fixing of the unit, a union nut or the like may be provided in a known manner. A significant saving in assembly time is achieved if all three connections are arranged coaxially with one another, and the pressure-regulating arrangement corresponds with an appropriate connecting piece which has three corresponding ducts that can be sealed off from one another and to which connecting piece the pressure-regulating arrangement can be connected directly by being plugged on or screwed on.

Further details and advantages of the subject of the invention emerge from the drawing of an exemplary embodiment and its detailed description which follows below.

DESCRIPTION OF THE DRAWINGS

The single FIGURE shows in schematic form a cross-section through a pressure-regulating arrangement according to the invention.

DETAILED DESCRIPTION OF THE INVENTION

Provided in a housing 1 (also referred to as a filter cartridge) in a manner known per se is a hollow cylindrical filter insert 2. Fuel is pumped into the housing 1 from a pump (not shown) via a feed 3 having a feed connection 4. The fuel flows from the outer peripheral surface of the filter insert 2 into its interior 5 and in so doing is mechanically freed of contaminants. From the interior 5 of the filter insert 2, the fuel flows via a flow 6 to the load (likewise not illustrated). In the process, it flows through a flow connection 7, to which a flow line (not shown) is to be connected. Also communicating with the interior 5 is an inlet connection 8 (perforated housing wall) of a pressure regulator 9, to which already filtered fuel is likewise fed. The flow pressure that is to be forwarded to the load, which is about 3500 hPa (3.5 bar), is thus present at the pressure regulator inlet. Associated with the pressure regulator 9 are a valve body 10 and a diaphragm 11 that is permanently connected to the latter. The flow pressure is applied over the whole of the said diaphragm 11 on one side; arranged on the other side is a compression spring 12, which biases the valve body 10 against its valve seat 13. The latter is formed of a the rim of an inlet of a cutoff duct 14.

The biasing of the compression spring 12, together with the pressure-loaded area of the diaphragm 11, defines the switching threshold of the pressure regulator 9. It is preferable if means are provided for adjusting the bias of the compression spring—for example an adjusting screw—, in order to be able to individually adapt and match the said switching threshold as required.

As can be seen, the cutoff duct 14 extends centrally and coaxially through the interior 5 of the filter insert 3. It opens into a cutoff connection 15, which is arranged on the same side of the housing as the two other connections 4 and 7.

The housing is preferably produced from sheet metal and is tightly closed at both ends by covers 16, 17. The (left-hand) cover 16 encloses the three connections of the pressure-regulating arrangement, whereas the (right-hand) cover 17 covers the pressure regulator 9, including the spring 12.

As a variation from the pictorial illustration, it is possible to arrange all three connections of the common housing coaxially with respect to one another, preferably centrally, as is already previously known in the case of normal fuel filters having only two connections. For the purposes of distributing the different streams further, it is then necessary to provide an appropriate connecting piece having three corresponding ducts which open coaxially, can be sealed off completely with respect to one another and can be connected separately on the other side of the connecting piece.

On the outer wall of the outer duct of the common housing, it is then necessary to provide, for example, a thread that can be screwed into a corresponding mating piece on the said connecting piece. Such a pressure-regulating arrangement could thus also be connected or replaced very rapidly and with an extremely low probability of a fault.

Without ruling out modifications, it may, for example, be expedient to guide the cutoff flow, as shown in the FIGURE, through a duct 14 that is located centrally on the inside. In the opening region, the flow 6 surrounds this duct as an annular duct and, for its part, is surrounded by a further annular duct for the feed 3 to the filter. It goes without saying that all three ducts have to be sealed off carefully with respect to one another and to the outside.

What I claim is:

1. A pressure regulator and fuel filter mechanism for use between a fuel pump and an internal combustion engine in which the mechanism has: (a) a housing comprised of a plurality of walls; (b) a cylindrical filter and a fuel pressure regulating and by-pass valve structure disposed within the housing; and (c) wherein the fuel filter mechanism further includes fuel input, output and by-pass connections extending through the same housing wall to provide commonly located fuel input, output and by-pass openings into and from the interior of the fuel filter mechanism.

2. A fuel filter mechanism as defined in claim 1 wherein the fuel pressure regulating and bypass valve structure is located on a side of the housing that is remote from the fuel input, output and bypass connections.

3. A fuel filter mechanism as defined in claim 1 or 2 wherein the bypass connection is located coaxially and centrally within the cylindrical filter.

4. A fuel filter mechanism as defined in claim 3 wherein the input connection to the pressure regulator and fuel filter mechanism is situated downstream of the cylindrical filter.

5. A fuel filter mechanism as defined in claim 1 wherein the fuel input, output and bypass connections into the housing are coaxial with respect to one another.

6. Pressure-regulating arrangement as defined in according to claim 5, wherein an inner, centrally arranged connection is enclosed coaxially by a first and a second connection in the form of an annular duct.

* * * * *